No. 843,953. PATENTED FEB. 12, 1907.
G. LARAMY.
TABLE UTENSIL.
APPLICATION FILED MAR. 29, 1906.
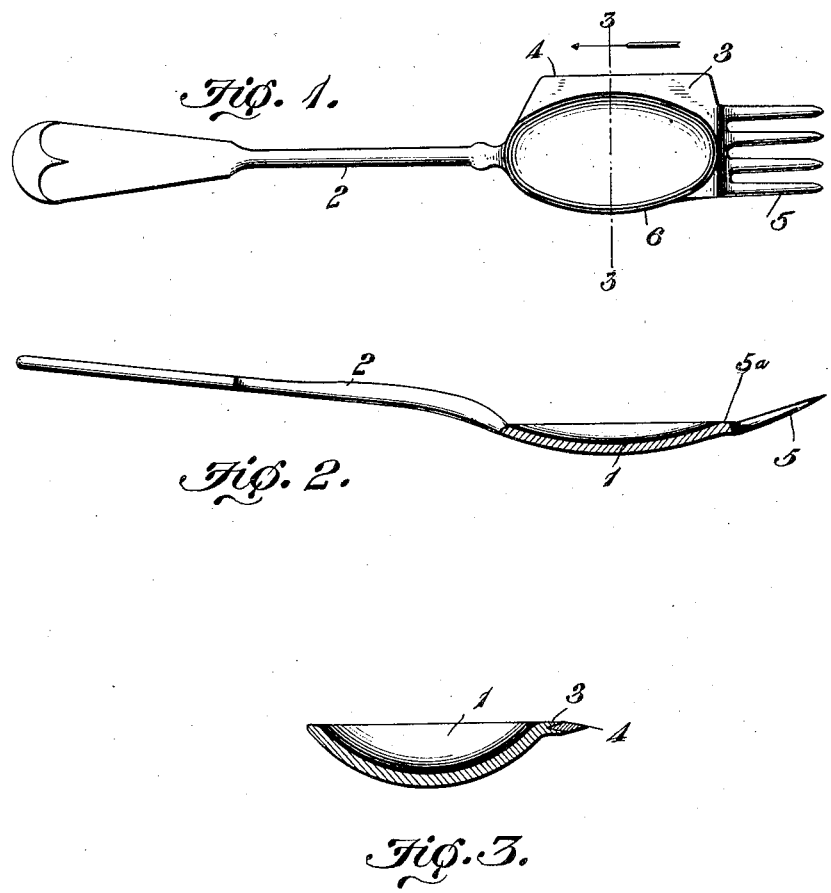
WITNESSES:
George Laramy,
INVENTOR.
By C. A. Snow & Co
ATTORNEYS

UNITED STATES PATENT OFFICE.

GEORGE LARAMY, OF ENFIELD, NEW HAMPSHIRE.

TABLE UTENSIL.

No. 843,953.  Specification of Letters Patent.  Patented Feb. 12, 1907.

Application filed March 29, 1906. Serial No. 308,798.

*To all whom it may concern:*

Be it known that I, GEORGE LARAMY, a citizen of the United States, risiding at Enfield, in the county of Grafton and State of New Hampshire, have invented a new and useful Table Utensil, of which the following is a specification.

This invention relates to utensils for table use; and its object is to provide a combined knife, spoon, and fork all formed in a single piece and any of which can be conveniently utilized, thereby rendering the device especially adapted for use by persons with one arm.

With these and other objects in view the invention consists of certain novel features of construction and combinations of parts, which will be hereinafter more fully described, and pointed out in the claim.

In the accompanying drawings is shown the preferred form of the invention.

In said drawings, Figure 1 is a plan view. Fig. 2 is a longitudinal section, and Fig. 3 is an enlarged transverse section.

Referring to the figures by numerals of reference, 1 is a spoon-bowl formed at one end of a handle 2 in the usual manner, and one side edge of the bowl is flanged, as at 3, to form a straight edge 4. This edge may be formed of the same material as the bowl or, if preferred, can consist of a steel blade inserted into the flange and welded or otherwise fastened in place. Fork-tines 5 extend from the end portion of the bowl; but the combined width of the bases of these tines is less than the width of the bowl, so that they will not hinder or prevent the curved edge 6 of the bowl being placed in the mouth or prevent the edge 4 from cutting into an object. It will be noted that the end portion of the bowl is reinforced by a straight flat portion 5ª, from which the tines 5 extend, and that the crotches formed between the tines are rounded. By constructing the device in this manner it becomes impossible for food to become wedged within the crotches, and, moreover, the connection between the tines and the bowl is rendered more secure.

The device illustrated in the drawings is intended to be held in the left hand, so that the edge 6 can be placed in the mouth. The arrangement of the edges 4 and 6 will be reversed where the spoon is to be grasped in the right hand.

What is claimed is—

An article of the class described comprising an oval spoon-bowl having a handle at one end, a straight enlargement on one side of the bowl and having an annular recess extending longitudinally in the outer edge thereof, a cutting-blade inserted and secured within said recess, an enlargement at one end of the bowl and merging into said enlargement at the side of the bowl, said end enlargement having a straight edge extending from side to side, and tines extending from the straight edge and of uniform length, the crotches between the tines being rounded.

In testimony that I claim the foregoing as my own I have hereto affixed my signature in the presence of two witnesses.

GEORGE LARAMY.

Witnesses:
EUGENE H. KING,
CARRIE KING.